United States Patent
Kovacs et al.

(10) Patent No.: US 7,110,372 B2
(45) Date of Patent: Sep. 19, 2006

(54) TRANSMISSION OF CARRY-ON OBJECTS USING A WIRELESS AD-HOC NETWORKING ENVIRONMENT

(75) Inventors: Ernö Kovacs, Stuttgart (DE); Oliver Schramm, Wolfschlugen (DE)

(73) Assignee: Sony Deutschland GmbH, Cologne (DE)

( * ) Notice: Subject to any disclaimer, the term of this patent is extended or adjusted under 35 U.S.C. 154(b) by 929 days.

(21) Appl. No.: 10/000,907

(22) Filed: Nov. 15, 2001

(65) Prior Publication Data

US 2002/0060994 A1    May 23, 2002

(30) Foreign Application Priority Data

Nov. 17, 2000   (EP)   .................................. 00125120

(51) Int. Cl.
   *H04Q 7/00*   (2006.01)
(52) U.S. Cl. ...................................... 370/328; 370/352
(58) Field of Classification Search ................. 370/328
   See application file for complete search history.

(56) References Cited

U.S. PATENT DOCUMENTS

| | | | |
|---|---|---|---|
| 5,970,122 A * | 10/1999 | LaPorta et al. ............ 340/7.23 |
| 5,987,011 A | 11/1999 | Toh | |
| 6,249,516 B1 * | 6/2001 | Brownrigg et al. ......... 370/338 |
| 6,377,805 B1 * | 4/2002 | Anvekar et al. ............ 455/436 |
| 6,842,439 B1 * | 1/2005 | Zeitfuss ...................... 370/328 |
| 6,870,816 B1 * | 3/2005 | Edwards et al. ............ 370/252 |
| 6,904,275 B1 * | 6/2005 | Stanforth ................. 455/343.1 |

FOREIGN PATENT DOCUMENTS

| | | |
|---|---|---|
| EP | 1 024 626 | 8/2000 |
| WO | WO 00 14982 | 3/2000 |

* cited by examiner

*Primary Examiner*—Chau Nguyen
*Assistant Examiner*—Rhonda Murphy
(74) *Attorney, Agent, or Firm*—Oblon, Spivak, McClelland, Maier & Neustadt, P.C.

(57) ABSTRACT

A carry on service which allows a mobile device adapted for wireless communication over a permanent communication network carries information objects on behalf of other devices. Carry on information objects are transferred from a carry on user device over a wireless ad-hoc network to a carry on provider device. There, they are stored until they can be forwarded to a carry on gateway device of the permanent communication network. This device forwards the carry on information objects to an appropriate service. The service provider checks the received information objects and executes the contained service requests.

29 Claims, 5 Drawing Sheets

TRANSMISSION OF CARRY-ON OBJECTS USING A WIRELESS AD-HOC NETWORKING ENVIRONMENT

CROSS REFERENCE TO RELATED APPLICATIONS

This application is based upon and claims priority under 35 U.S.C. § 119 from European Patent Application No. 00 125 120.6, filed Nov. 17, 2000.

FIELD OF THE INVENTION

The present invention relates in general terms to the transmission of carry-on objects using a wireless ad-hoc networking environment.

BACKGROUND OF THE INVENTION

A user of a user device which is adapted for communication over a permanent (not temporary) communication network may wish to send an information object to a desired destination in a situation where the user device is disconnected from the permanent communication network. A possible situation of disconnection is, for example, a mobile phone the user of which is far off the next base station of a wireless communication network (e.g. according to GSM or UMTS standard) so that no connection between the mobile phone and the base station can be established. This may be the case in a mountainous area, for example. Another situation is, for example, a notebook computer used by a businessman on a journey and no access to the Internet or any other communication network is available at the moment (may be because the businessman has left at home a radio adapter for the notebook computer that otherwise might allow wireless communication of the notebook computer over a wireless communication network). It is clear that a lot more situations of temporary disconnection of a user device from a permanent communication network are conceivable.

A typical information object a user of a user device might wish to transmit is, for example, an SMS message or an e-mail message. Another example of an information object is a software program which might be used by a receiving computer to execute a particular task. Still another example of an information object is a file or a set of data, e.g. measuring data or data resulting from calculations, to be transmitted to a customer or to a coworker.

In case of disconnection from the permanent communication network the user of the user device has the option to wait until communication of his user device over the permanent communication network is possible again. However, this may take a long time, and in some cases too long, e.g. when an urgent message has to be transmitted. Waiting for re-connection to the permanent communication network may not be acceptable then.

From U.S. Pat. No. 5,613,206 A it is known to share a single communication channel of a cellular wireless communication network among a plurality of mobile terminals. The mobile terminals are connected with each other over a wireless ad-hoc subnetwork. One of the mobile terminals acts as a master while the others are slaves within the subnetwork. Whenever a slave wants to use the communication channel it notifies a corresponding request to the master. The master allocates the communication channel to the slaves based upon the incoming requests.

From U.S. Pat. No. 5,970,122 there is known a wireless messaging system which includes a messaging network having a respective user agent for each of a plurality of subscribers. The user agent includes a plurality of messages prestored therein. Each message is allocated to a respective message code. Whenever a subscriber wants to forward a message to a desired receiver, it sends the corresponding message code to its user agent. The user agents expands the received message code to the full message and effects transmission of the expanded message to the desired receiver.

SUMMARY OF THE INVENTION

It is an object of the present invention to enable a user of a user device adapted for communication over a permanent communication network to transmit an information object to a desired destination even when the user device is temporarily disconnected from the permanent communication network.

According to a first aspect of the present invention, to achieve the above object there is provided a method of transmitting an information object from a first user device adapted for communication over permanent communication network means to a destination, characterized by the steps of:
   determining whether the first user device is connected to the permanent communication network means or is disconnected therefrom,
   in case of connection of the first user device to the permanent communication network means, transmitting the information object from the first user device directly over the permanent communication network means, and
   in case of disconnection of the first user device from the permanent communication network means, transmitting the information object from the first user device over wireless ad-hoc network means to a second user device of the permanent communication network means, the second user device acting as a temporary intermediate carrier of the information object, and forwarding the information object from the intermediate carrier over the permanent communication network means.

In the inventive solution, when the information object cannot be transmitted from the first user device directly over the permanent communication network means, the information object is "diverted" to another user device acting as an intermediate carrier which temporarily carries the information object and effects forwarding of the information object to the desired destination. The transmission of the information object from the first user device to the intermediate carrier is carried out in an ad-hoc networking environment (preferably a wireless one) without using the permanent communication network means. In this way, urgent information objects can be quickly delivered to the desired destination even in a situation of disconnection of the first user device from the permanent communication network means.

Herein, the term permanent communication network comprises both wired and wireless communication networks. Permanent communication networks are to be distinguished from ad-hoc networks the latter existing only temporarily and only for dedicated purposes. For detailed information on and definitions of ad-hoc networking it is referred, for example, to EP 0 116 036.5 filed on Jul. 25, 2000.

In particular, the information object may be transmitted from the first user device via a plurality of at least two successive intermediate carriers to the destination, the information object being transmitted from the first user device to a first one of the intermediate carriers and between each pair of two successive ones of the intermediate carriers over the (preferrably wireless) ad-hoc network means, the information object being forwarded from a last one of the intermediate carriers over the permanent communication network means. Thus, the information object may be carried by several intermediate carriers in an iterative manner before finally being sent over the permanent communication network means to the desired destination, or vice versa.

Preferably, the first user device is a mobile device adapted for wireless communication over the permanent communication network means. Furthermore, the second user device may be a mobile device adapted for wireless communication over the permanent communication network means. However, it is to be understood that at least one of the first and second user devices, in particular the second user device, may be a stationary terminal, e.g. a desktop computer, adapted for communication over the permanent communication network means.

After having accepted the information object, the intermediate carrier will preferably forward the information object automatically. i.e. without interaction of a user of the intermediate carrier.

In a normal case, the information object will be transmitted from the first user device to only one single intermediate carrier. It is not excluded, however, that the information object may be transmitted from the first user device in parallel to a plurality of intermediate carriers.

The transmission of the information object from the first user device to the intermediate carrier may be performed automatically, i.e. without user control. Alternatively, the information object may be transmitted from the first user device to the intermediate carrier only upon request of a user of the first user device.

A user of the first user device may be given the opportunity to manually select a particular intermediate carrier. Then, the information object will be transmitted from the first user device to the selected intermediate carrier. Alternatively, the first user device may automatically discover an available intermediate carrier, the information object then being transmitted from the first user device to the discovered intermediate carrier.

In order to enable the authenticity of the source (original sender) of the information object to be checked, the information object may be digitally signed before transmitting the information object from the first user device.

In order to ensure that any unauthorized person or entity, in particular any intermediate carrier, cannot read the content of the information object, the information object may be encrypted before transmitting the information object from the first user device.

In order to inform the receiving party about the original sender of the information object, sender information indicating the first user device as a sender of the information object is preferably included into the information object, the sender information included into the information object being forwarded to the destination.

The intermediate carrier may be rewarded for receiving and forwarding the information object. The reward may consist in a financial bonus, for example.

Priority information may be included into the information object before transmitting the information object from the first user device. The priority information indicates a level of priority of the information object, and the intermediate carrier and/or a service provider of the permanent communication network means might handle the information object according to its level of priority.

Furthermore, lifetime information may be included into the information object before transmitting the information object from the first user device. The lifetime information indicates an expiring date of the information object, and the intermediate carrier and/or a service provider of the permanent communication network means might annul, i.e. delete or not consider any more, the information object if it has not reached the destination by the expiring date.

The intermediate carrier may automatically accept and store the information 0object. Alternatively, the intermediate carrier may accept and store the information object only upon agreement (e.g. by pressing a button) of a user of the intermediate carrier.

When an available memory space of the intermediate carrier is too small, the latter may deny the information object. If the sending first user device is notified of the denial, it can start a further attempt and send the information object to another intermediate carrier. If no notification is given to the first user device, the information object might get lost.

It may happen that one or more old information objects are already stored in the intermediate carrier at the time of arrival of a new information object and an available memory space in the intermediate carrier for the new information object is too small. Then, in order to be able to accept the new information object, the intermediate carrier may remove at least one of the old information objects so as to provide sufficient memory space for the new information object. To this end, in case of a plurality0 of old information objects being stored in the intermediate carrier at the time of arrival of the new information object, at least one of the old information objects may be selected and removed dependant on an age of the old information objects. Alternatively or additionally, at least one of the old information objects may be selected and removed dependant on a level of priority of the old information objects.

Having accepted an information object, the intermediate carrier will first check whether there is a connection to the permanent communication network means or not. In case of connection of the intermediate carrier to the permanent communication network means, the intermediate carrier will forward the information object over the permanent communication network means.

In case of disconnection of the intermediate carrier from the permanent communication network means, the intermediate carrier may wait for re-connection to the permanent communication network means, the information object then being forwarded from the intermediate carrier over the permanent communication network means. Alternatively, the intermediate carrier may forward the information object over the ad-hoc network means to another intermediate carrier, optionally after a predetermined period of waiting for re-connection of the intermediate carrier to the permanent communication network means has elapsed.

The basic idea of using an intermediate carrier is applicable not only when transmitting an information object from an originating user device but also when delivering an information object to a receiving user device. Therefore, when an information object is to be transmitted from a source to a third user device of the permanent communication network means, it will first be determined whether the third user device is connected to the permanent communication network means or is disconnected therefrom. In case of connection of the third user device to the permanent communication network means, the information object will be transmitted over the permanent communication network means directly to the third user device. In case of disconnection of the third user device from the permanent communication network means, the information object may be transmitted over the permanent communication network means to a fourth user device of the permanent communication network means, the fourth user device acting as a temporary intermediate carrier of the information object. From the intermediate carrier the information object may then be forwarded over wireless ad-hoc network means to the third user device.

Preferably, the third user device is a mobile device adapted for wireless communication over the permanent communication network means.

Further, the fourth user device may be a mobile device adapted for wireless communication over the permanent communication network means.

According to a second aspect of the present invention, there is provided a method of operating a first user device adapted for communication over permanent communication network means, the method comprising transmitting from the first user device an information object destined to be forwarded to a destination, characterized by the steps of:
  determining whether the first user device is connected to the permanent communication network means or is disconnected therefrom,
  in case of connection of the first user device to the permanent communication network means, transmitting the information object from the first user device directly over the permanent communication network means, and
  in case of disconnection of the first user device from the permanent communication network means, transmitting the information object from the first user device over wireless ad-hoc network means to a temporary intermediate carrier of the information object to be subsequently forwarded from the intermediate carrier to the destination, the intermediate carrier being a second user device of the permanent communication network means.

In the method according to the second aspect, the first user device preferably is a mobile device adapted for wireless communication over the permanent communication network means.

Further, in the method according to the second aspect, the information object may be transmitted automatically from the first user device to the intermediate carrier, or only upon request of a user of the first user device.

The method according to the second aspect may comprise automatically discovering an available intermediate carrier by the first user device and transmitting the information object from the first user device to the discovered intermediate carrier. Alternatively, the method according to the second aspect may comprise selecting a particular intermediate carrier through a user of the first user device and transmitting the information object from the first user device to the selected intermediate carrier.

Moreover, in the method according to the second aspect, the information object preferably is digitally signed and encrypted before being transmitted from the first user device. Advantageously, sender information to be forwarded to the destination is included into the information object, the sender information indicating the first user device as a sender of the information object. Conveniently, the sender information will be automatically included into the information object by the first user device, i.e. without user control.

Preferably, priority information and lifetime information is included into the information object before transmitting the information object from the first user device.

In the method according to the second aspect, the first user device may be operated as a temporary intermediate carrier for an information object to be forwarded over the permanent communication network means to a destination, the first user device receiving the information object over the wireless ad-hoc network means from a third user device of the permanent communication network means. Preferably, the first user device will automatically forward the received information object.

Before forwarding the received information object, there will be carried out a determination as to whether the first user device is connected to the permanent communication network means or is disconnected therefrom Then, in case of connection of the first user device to the permanent communication network means, the information object may be forwarded from the first user device over the permanent communication network means to the destination.

In case of disconnection of the first user device from the permanent communication network means, the first user device may wait for re-connection to the permanent communication network means, and after re-connection the information object may be forwarded from the first user device over the permanent communication network means. As an alternative, in case of disconnection of the first user device from the permanent communication network means, the information object may be forwarded from the first user device over the ad-hoc network means to another intermediate carrier, optionally after a predetermined period of waiting for re-connection of the first user device to the permanent communication network means has elapsed.

In the method according to the second aspect, the first user device may accept and store the information object (received from a third user device) automatically or only upon agreement of a user of the first user device.

Further, the method according to the second aspect may comprise denying the information object (received from a third user device) by the first user device when an available memory space of the first user device is too small.

Moreover, the method according to the second aspect may comprise removing at least one old information object stored in the first user device when an available memory space of the first user device at the time of arrival of a new information object is too small. In case of a plurality of old information objects being stored in the first user device at the time of arrival of the new information object, at least one of the old information objects may be selected and removed dependant on an age and/or a level of priority of the old information objects.

Furthermore, the first user device may be operated as a temporary intermediate carrier for an information object to be forwarded over the wireless ad-hoc network means to a fourth user device of the permanent communication network means, the first user device receiving the information object over the permanent communication network means or from another intermediate carrier over the wireless ad-hoc network means.

According to a third aspect, the present invention further provides a computer program for carrying out the above method according to the second aspect when executed by a processor of a user device adapted for communication over permanent communication network means.

Finally, according to a fourth aspect, the present invention provides a user device adapted for communication over permanent communication network means, the user device being adapted to be operated by the above method according the second aspect.

BRIEF DESCRIPTION OF THE DRAWINGS

In the following the present invention is described in greater detail in relation to the accompanying drawings in which.

DETAILED DESCRIPTION OF THE INVENTION

Figure 1:
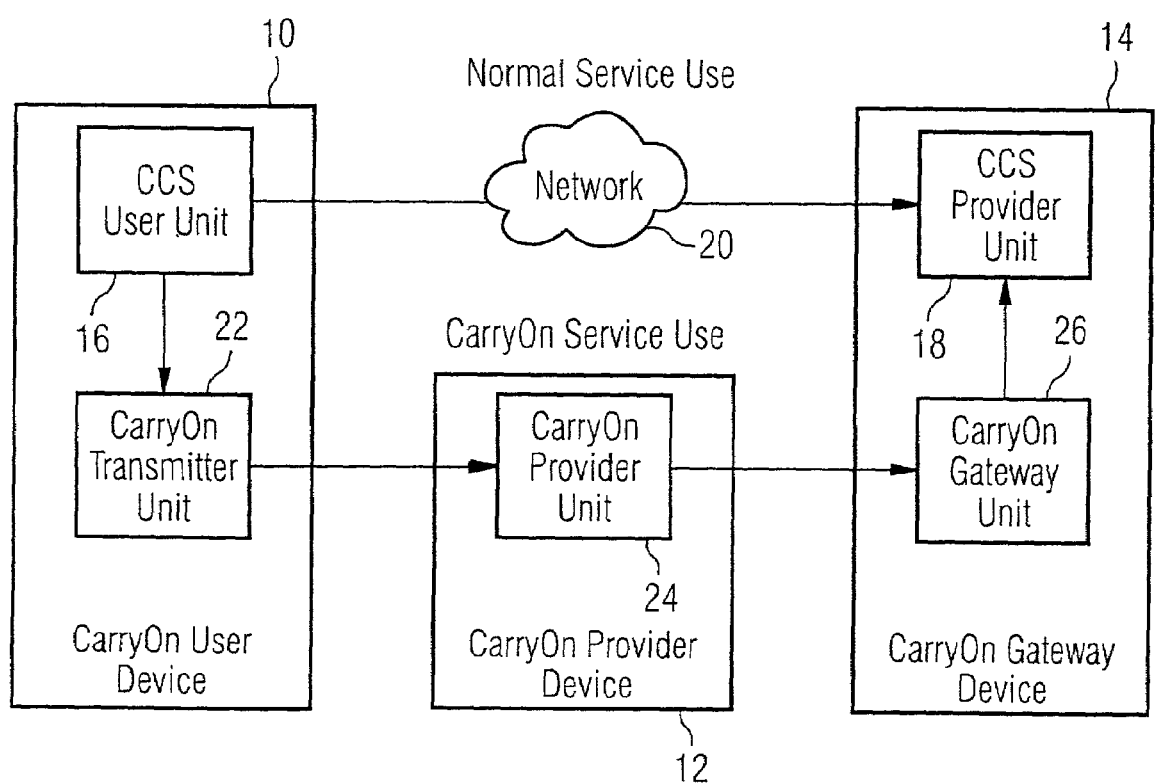
FIG. 1 illustrates a scheme of a carry on service according to the present invention.

In general words, the present invention provides for the transmission of arbitrary information objects (hereinafter referred to as carry on objects) in a secure way from a first user device (in the following referred to as a carry on user device) to a target information service provider using at least one second or intermediate user device (hereinafter referred to as a carry on provider device). The carry on provider device stores the carry on object until the latter can be transmitted to the target information service provider. As an additional feature, the owner of the carry on provider device may be rewarded with friend points, allowing him to be rewarded for his service. In the following, it is assumed that the carry on user device and the carry on provider device are mobile devices, although they can be stationary devices, as well.

Mobile devices like PDAs (Personal Data Assistants), mobile phones or wearable computers will become ubiquitously available in the future. These devices will be able to use wireless ad-hoc networks to connect with each other. Examples for ad-hoc networks are: Infrared, Bluetooth, Hipperlan/2. The major properties of ad-hoc networks are:

a) they can work without a pre-installed networking infrastructure, and b) they are able to discover other devices (and services) within the ad-hoc network.

The mobile devices considered herein are able to use services provided through a permanent (wired or wireless) communication network, whenever they come near to an attachment point to the permanent communication network. The service can be either a location dependent service or a general networked service (like services accessible over the Internet).

Usually services can be accessed when a network connection is available. In an ad-hoc network as well as in wireless networks, this may not be the case. Instead, for some of the services one has to work in a disconnected state of the mobile device and wait until a connection to the network is established again. One example is an instant messaging service, where messages can be entered into the mobile device in a disconnected state but sent out only when a connection is established.

Using ad-hoc networks, mobile devices can communicate with each other. According to the present invention, this is used to create a carry on service. This carry on service can be used to relay data objects to other devices, which might connect to the permanent communication network earlier than the original source device. One of the advantages of this kind of carry on service is that it can be used by other services to perform their tasks. The service can be created in such a way that also objects from the permanent communication network can be sent to mobile devices. However, this case is less likely as it is not guaranteed that the information objects reach their destination. Therefore, it is less likely (but not excluded) that services will use this direction.

One scenario where such kind of carry on service might be of interest is the following: A user creates a set of messages and stores them on his mobile device. When meeting with a friend, he instructs his mobile device to transfer the messages to the other user's mobile device. Whenever the friend attaches to the permanent communication network, his mobile device then forwards the messages to the appropriate network-based service.

Advantages of such a carry on service are: A provider of the carry on service can help a user of the carry on service; the carry on user can work in a disconnected state and will have a better service (for instance fast processing of requests); and the carry on service can be regarded as a general support service for mobile devices and ad-hoc networks.

A carry on service suitable for practical applications will preferably provide the following features:

a) The data are transmitted using an intermediate device. To protect the data from being inspected, the data should be encrypted in such a way that only the receiver can decrypt them. This can be done through the use of a public key infrastructure, for example.

b) The data are transmitted through an intermediate node. To protect the service against unauthorized usage, the data should be securely signed, so that a service provider can check the authorization.

c) The provider of the carry on service must have full control over the provided service.

d) Usage of the carry on service should be configurable so as to be able to employ different behavior policies. This applies to the carry on user and to the carry on provider.

In the following, some remarks on the underlying technology are given.

Ad-hoc Computing Systems

When implementing the carry on system according to the present invention, support must be given on several levels of the system:

a) Ad-hoc networking: The ability to immediately integrate a mobile device into an ad-hoc network.

b) Ad-hoc services: The ability to immediately access ad-hoc services. This includes service discovery, service selection, service access and service subscription.

c) Ad-hoc customization: The ability to immediately customize an ad-hoc service to the needs of the user. This involves the fast, probably automatic customization of a service subscription, resource reservation and personalization of the service.

Known ad-hoc networks are, for example: Infrared networks (e.g. using the IRDA protocol suit), Bluetooth networks, or Hipperlan/2 networks. Other networks (e.g. body networks like personal area networks) may also incorporate ad-hoc networking features.

Mobile Services:

Mobile services are offered to mobile users through the use of different kind of (wireless) networks. They provide dedicated content that is specially prepared for the used mobile device. Usually the initial contact to a mobile service is a (mobile) service portal. This service portal is offering a set of services to the user. After authenticating himself to the (mobile) service portal, the user is presented with his choice of subscribed services (his service profile). He can then interact with this service. Mobile services will automatically adapt to the user's device. They might use an application level gateway to reach the user's device. A WAP gateway is an example for this. Mobile services may rely on a distributed set of other services and service components.

Mobile Devices

Mobile devices comprises a plurality of different devices such as mobile phones, PDAs, wearable computers, and many more. Sometimes this class of devices is also called Edge-of-Network devices (EON).

In the following, the present invention will be further explained in more detail using the so-called ODP (Open Distributed Processing) methodology. The following five ODP viewpoints are used:

1. enterprise viewpoint (purpose of the system, role in the enterprise, boundaries of the system, use cases—requirements from a customer perspective)
2. computational viewpoint (system functionality)
3. information viewpoint (structure of the information managed by the system)
4. engineering viewpoint (mechanisms implementing the system functionality and providing distribution transparencies)
5. technology viewpoint (technical solutions used for achieving the goals of the aforementioned viewpoints)

Enterprise Viewpoint

This section describes the purpose of the described networked service.

Purpose of the Carry On Service:

As to the general purpose of the carry on service according to the present invention, it is referred to FIG. 1. The carry on service allows a mobile device to carry information objects (data objects) on behalf of another user. Carry on data objects are transferred from a carry on user device 10 to a carry on provider device 12. The carry on data objects are stored in the carry on provider device 12 until they can be forwarded to a carry on gateway device 14. The latter device 14 forwards the carry on data objects to an appropriate service. The service provider checks the received data and executes the contained service requests.

The carry on service may be used whenever the mobile device 10 is in a disconnected state. The most common usage of the carry on service will be data transfers among friends, although other usages may be envisioned. Through iterating the transfer via a plurality of carry on provider devices 12, several mobile devices might work together.

Roles in the Carry On Service:

The carry on service is a support service that is used by other services (see FIG. 1 for an overview). These services are called carry on client services (CCS). Usually a CCS user unit 16 communicates directly with a CCS provider unit 18 over a permanent communication network 20. In case of disconnection of the mobile device 10 from the network 20, the CCS service can use the carry on service according to the present invention. In this case, the CCS service transmits carry on objects from the carry on user device 10 over a wireless ad-hoc network (not shown in detail) to the carry on provider device 12. The carry on service can be automatically used or only upon request by a human user.

In the normal network infrastructure, a service provider operates a carry on enabled service (carry on client service provider, CCS SP). Whenever the carry on provider device 12 connects to the network 20, carry on objects are transferred to the carry on gateway device 14. The carry on gateway service which is operated either directly by a carry on enabled service provider or by an intermediate carry on gateway service provider may be used to forward the carry on objects.

The information transfer is usually from a mobile device towards the network 20 and the service provider there. It is possible to use the carry on service in the opposite direction even though it will be harder then to ensure that the carry on objects are transmitted in time.

Boundaries of the System:

It is to be understood, that the system will not give any guarantees to the user. Whenever it is required, a carry on provider may be allowed to delete a carry on object. In this sense, the carry on service is simply a best-effort-service.

Policies:

System policies define the behavior of the system in specific situations. There may be defined a plurality of system policies. In the following, several exemplary policies are explained in detail.

a) Carry on admission policy: This policy applies to the carry on user device 10 and defines the behavior of the carry on user device 10 as to when to transmit carry on objects. The carry on admission policy may define an automatic mode of operation in which the carry on user device 10 is operated such as to automatically transmit any carry on object to another mobile device. There may also be defined a manual mode of operation of the carry on user device 10 in which carry on objects are transmitted only to dedicated devices which are manually selected by the user of the carry on user device 10. It is conceivable that the user can arbitrarily switch between the automatic mode and the manual mode. In the automatic mode, there may be defined a timeout parameter which indicates a limit of lifetime of the carry on objects on the carry on user device 10.

b) Carry on provisioning policy: This policy applies to the carry on provider device 12 and defines the behavior of the carry on provider device 12 as to when to receive carry on objects. The carry on provider device 12 may be operated in an automatic mode in which all incoming carry on objects are automatically received and stored. Alternatively, the carry on provider device 12 may be operated in a manual mode in which the user of the carry on provider device 12 is asked for his acceptance to receive a carry on object. Again, the carry on provider device 12 may be manually switchable between the automatic mode and the manual mode.

c) Carry on accept policy: This policy applies to the carry on provider device 12 in the automatic mode thereof and defines constraints on the automatic reception of carry on objects. These constraint are defined by one or more carry on accept rules which have to be checked before accepting an incoming carry on object. For example, the carry on accept rules may be related to a set of allowed users, an allowed size of the carry on objects, constraints on lifetime of the carry on objects, etc. In its automatic mode, the carry on provider device 12 may be operated in a first submode in which the carry on accept rules are activated and have to be checked, or in a second submode in which the carry on accept rules are deactivated and thus are not considered. Again, the user of the carry on provider device 12 may have the possibility to switch between the two submodes.

d) Carry on memory policy: This policy applies to the carry on provider device 12 and to a carry on transmitter unit 22 within the carry on user device 10. It defines how much memory space can be used for storing carry on objects. According to the carry on memory policy, a carry on memory rule having a predetermined memory space as a rule parameter is checked in relation to every carry on object. A user of the carry on provider device 12 or the carry on user device 10 may have the option to deactivate the carry on memory rule on the mobile device, if desired.

e) Carry on replacement policy: This policy applies to the carry on provider device 12 and to the carry on transmitter unit 22. It defines how the respective device reacts in a case where is not enough memory space available. According to the carry on replacement policy, several modes of operation may be defined. In a first mode (denial-of-access mode), new carry on objects would be denied. In a second mode (priority-based replacement mode), old objects would be replaced based on a level of priority first, then on age. In a third mode (age-based replacement mode), old objects would be replaced based on age first, then on their level of priority. Again, a user of the carry on provider device 12 or the carry on user device 10 may have the option to switch between these three modes.

Computational Viewpoint

The computational viewpoint identifies the logical entities in a distributed system that work together to provide a specific service.

Carry On Client Service (CCS):

The carry on client service (CCS) is an arbitrary networked service that utilizes the carry on service. In general, it involves the CCS user unit 16 and the CCS provider unit 18. During normal service use, these units 16, 18 communicate directly with each other using the network 20 (e.g. Internet or GSM network). In case of disconnection of the carry on user device 10, the CCS can utilize the carry on service.

Carry On Service:

The carry on service is a service offered in conjunction by a mobile device and a node attached to the permanent communication network. A user of the carry on service (for instance the CCS user unit 16) can use the carry on transmitter unit 22 to communicate with a carry on provider unit 24. During the communication, a carry on object is transmitted. This object is stored in the carry on provider device 12. Whenever this device 12 connects to the permanent communication network 20, the carry on object is forwarded to a carry on gateway unit 26. The latter retrieves a service indicator (and possibly an address) from the carry on object. Using that information the carry on object can be forwarded to a CCS receiver unit. In the CCS receiver unit, the authenticity of the data object can be checked and the original request executed.

The security of the system is preferably enforced by the use of encryption technologies. Public key cryptography methods allow to encrypt the original object in such a way that only the CCS receiver unit can decrypt it. Digital signatures contained within the encrypted part and in a digital envelope around the encrypted part can ensure the authenticity of the object.

Information Viewpoint

The information viewpoint describes the information object handled by the described service.

Transferred Object:

The main purpose of the carry on service is to forward a data object from the CCS user unit 16 to the CCS provider unit 18. Hereinafter, this data object is called the transferred object. The real structure of the transferred object is transparent to the carry on service. At the boundary between the CCS service and the carry on service, the transferred object is represented as a binary object. This can be achieved by serializing the data object.

Carry On Objects

Figure 5:
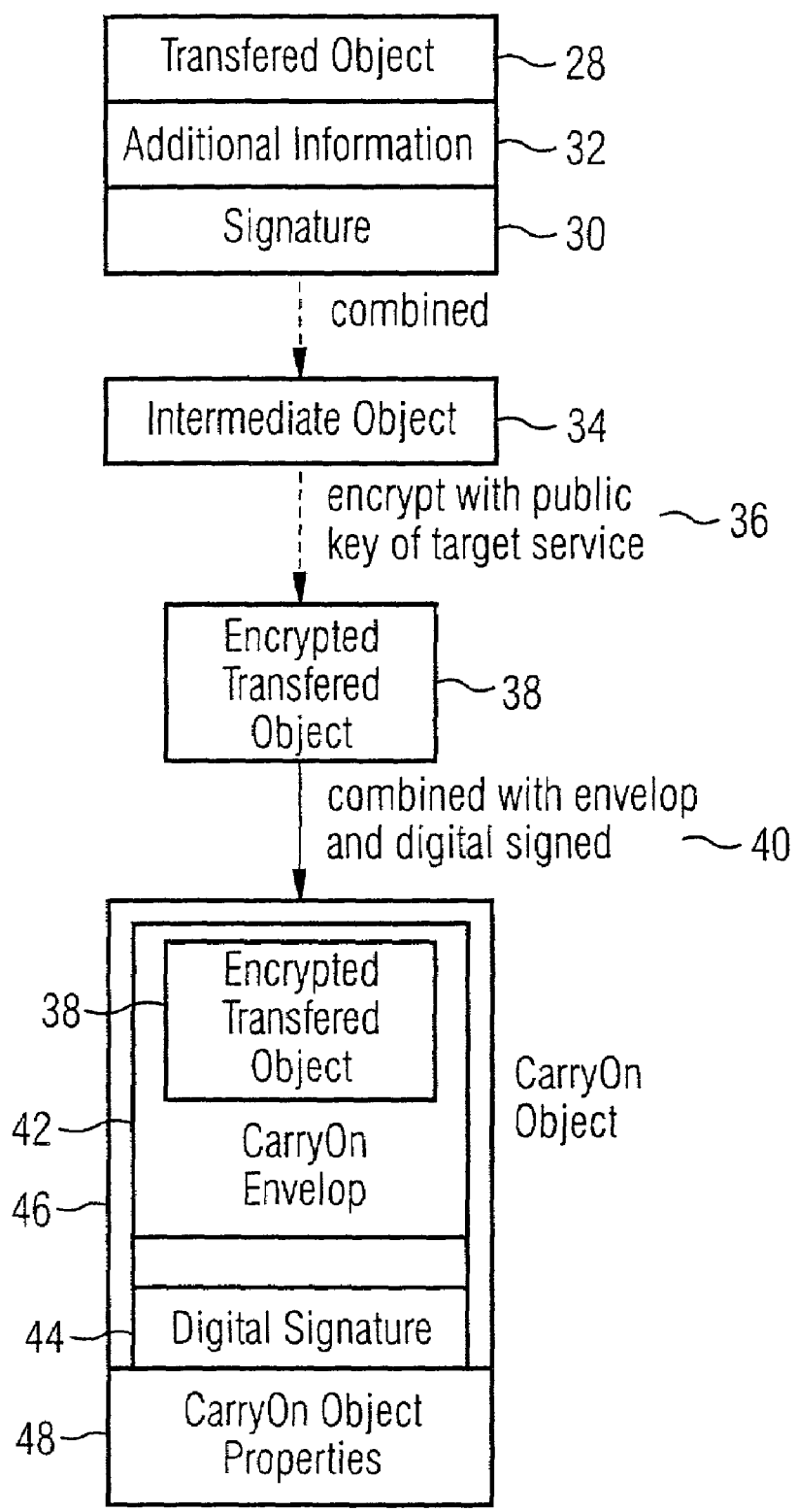
FIG. 5 illustrates the creation of a carry on transfer object.

The carry on service transfers carry on objects. Carry on objects are created from the transferred objects through a set of transformation steps (see FIG. 5). In FIG. 5, the transferred object is designated by 28. First, the carry on transmitter unit 22 digitally signs (at 30) the transferred object 28. If needed, additional information 32 may be included in the digital signature. The resulting intermediate object designated by 34 is then encrypted (at 36) using, for example, the public key of the receiving service. The encrypted transferred object designated by 38 is then combined (at 40) with a carry on envelope 42 and is again digitally signed. The carry on envelope 42 contains administrative information like the name of the sender, proposed lifetime of the object, the target service and required addressing information. Through the digital signature (designated by 44), the authenticity of the information can be guaranteed. The resulting object is the carry on object which is designated by 46.

Carry On Envelope:

The carry on envelope is a data item containing several pieces required to perform the carry on service. Among others, this data item may comprise:

user names: The user can be identified with the help of a unique user name. Several different naming formats are possible. An advantageous selection would be names in the form of <user>@<organization>, wherein a) <user> would be a text string built from the name of the user, and b) <organization> would be a text string identifying an organization that guarantees uniqueness of <user>. Furthermore, it would be of advantage, if <organization> would be a DNS name. Also, it would be of advantage if <organization> would identify a certificate authority that issues certificates for the user. In that way, the <organization> name could be used to look up and verify certificates for the user.

service identifier: As a part of the carry on envelope 42, the carry on gateway will use the service identifier to find the right service to which the carry on object is to be forwarded.

service address: The service address is an additional information used by the carry on gateway to find the right way of transmitting the carry on object to the CCS provider.

expire date: The expire date is a data item contained in the carry on envelope that defines the lifetime of the carry on object. For security reasons it might be replicated as a part of the intermediate object 34.

priority: A priority given by the carry on user. Dependent on the carry on object's level of priority the carry on user may have to pay friend points to the carry on provider, for example.

Carry On Object Properties:

Carry on object properties (designated by 48) are properties that describe the carry on object 46, but are not signed by the original creator of the list. These may be properties that are set by the carry on provider or the carry on gateway. Most of them are optional. Examples are a carry on provider list (a list of intermediate carry on providers) and the reception time (the time when a data object was received).

Other Information:

It is to be understood that besides the above information items others might be used.

Engineering Viewpoint

The engineering viewpoint describes in detail the structure of the carry on service and the involved components.

Figure 3:
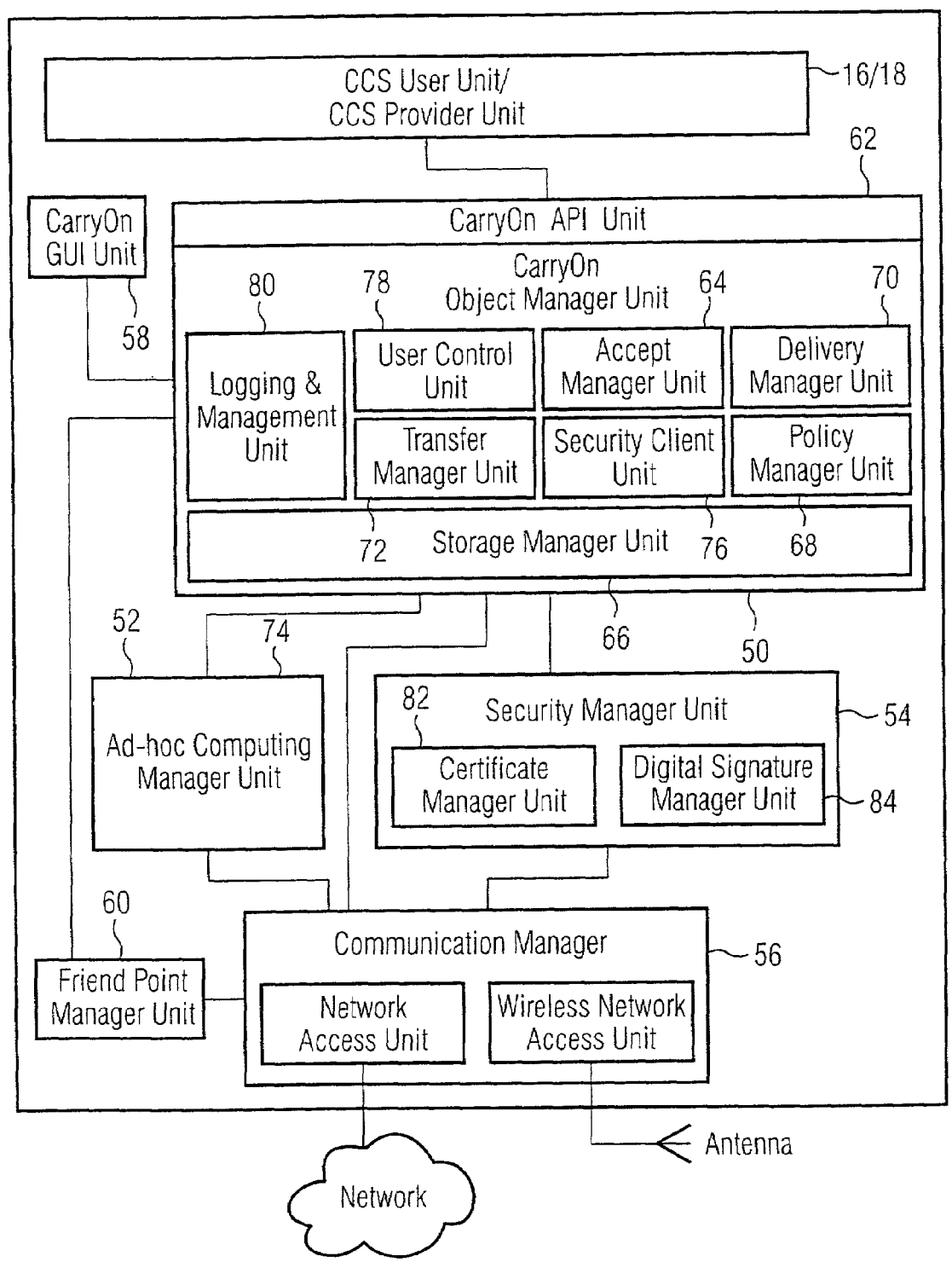
FIG. 3 illustrates an architecture of the carry on service.

According to an embodiment of the present invention, the carry on service is provided by a carry on object manager unit 50 (see FIG. 3). This unit will work together with other units (e.g. an ad-hoc computing manager unit 52, a security manager unit 54, a communication manager unit 56, a carry on GUI (graphical user interface) unit 58, a friend point manager unit 60, etc.) to provide the carry on service.

Carry On Object Manager Unit 50:

The carry on object management unit 50 provides the carry on service. It may be represented in different configurations on the carry on user device 10, on the carry on provider device 12 and on the carry on gateway unit 26. In the following, several sub-units of the carry on object manager unit 50 will be described. All units can be either hardware or software elements.

Carry On API (Application Protocol Interface) Unit 62:

This unit offers the carry on service to other components. Depending on the used operating system and implementation method, the API may be provided in different programming languages or by the use of different middleware systems (for instance Java RMI, CORBA, DCOM, etc.).

Accept Manager Unit 64:

The task of this unit is two-folded. First, it accepts carry on objects from the CCS user unit 16 (through the API unit 62). These objects are stored in a storage manager unit 66 and scheduled for forwarding to other devices. Secondly, it accepts carry on objects from other devices (e.g. with the help of the communication manager 56). To this purpose, it may check policy settings in a policy manager unit 68 and security settings in the security manager unit 54.

On the carry on provider device 12, the carry on object is stored in the storage manager unit 66 and scheduled for forwarding to the carry on gateway unit 26. On the carry on gateway device 14, the carry on object is verified and forwarded to the appropriate service.

Delivery Manager Unit 70:

This unit is the counterpart of the accept manager unit 64. Its task is to plan and schedule delivery of carry on objects to a target device. For the real transmission, it uses a transfer manager unit 72. For checking whether suitable devices are available in the ad-hoc network, it uses an ad-hoc computing manager (ACM) unit 74 for device discovery and service discovery. When a new device is found, the type of the device and the offered service are checked. If there are data objects scheduled for transfer, the objects are transmitted to the transfer manager unit 72.

Transfer Manager Unit 72:

This unit transmits the carry on object with the help of the communication manager 56 through whatever network is available. It ensures reliability of the transfer.

Security Client Unit 76:

This is the interface unit to the security manager 54. It executes security checks for the other units.

Policy Manager Unit 68:

This unit stores policy settings and checks them on behalf of other units.

User Control Unit 78:

This unit works with the carry on GUI unit 58 and the carry on API unit 62 to guarantee user control. It is used to set or verify the policy parameters and, in addition, operation parameters of the carry on object manager unit 50. For example, it may enforce direct transfer of stored carry on objects on request of the user.

Storage Manager Unit 66:

This unit stores the carry on objects and manages the available memory space. For example, it removes expired carry on objects or decides which carry on object is to be replaced in case there is not enough memory space available.

Logging and Management Unit 80:

This unit logs carry on service activities and allows to manage the services (monitor, manipulate, control) from remote places. It uses the security manager unit 54 for checking the authentication and authorization of the requesting user.

Support Units:

In the following, several support components illustrated in the embodiment of FIG. 3 are briefly explained.

Carry On GUI Unit 58:

This unit provides a user interface allowing the human user to control the behavior of the carry on service.

Friend Point Manager Unit 60:

An optional support component that allows to reward friends with friend points—an imaginary money unit. Of course, an interface to a real billing system can be included, too.

Ad-hoc Computing Manager Unit 74:

A middleware unit offering service like device discovery, service discovery and others.

Security Manager Unit 54:

A unit that manages certificates (certificate manager unit 82) and digital signatures (digital signature manager unit 84).

Communication Manager 56:

A unit that allows access to wired and wireless networks.

Figure 4:
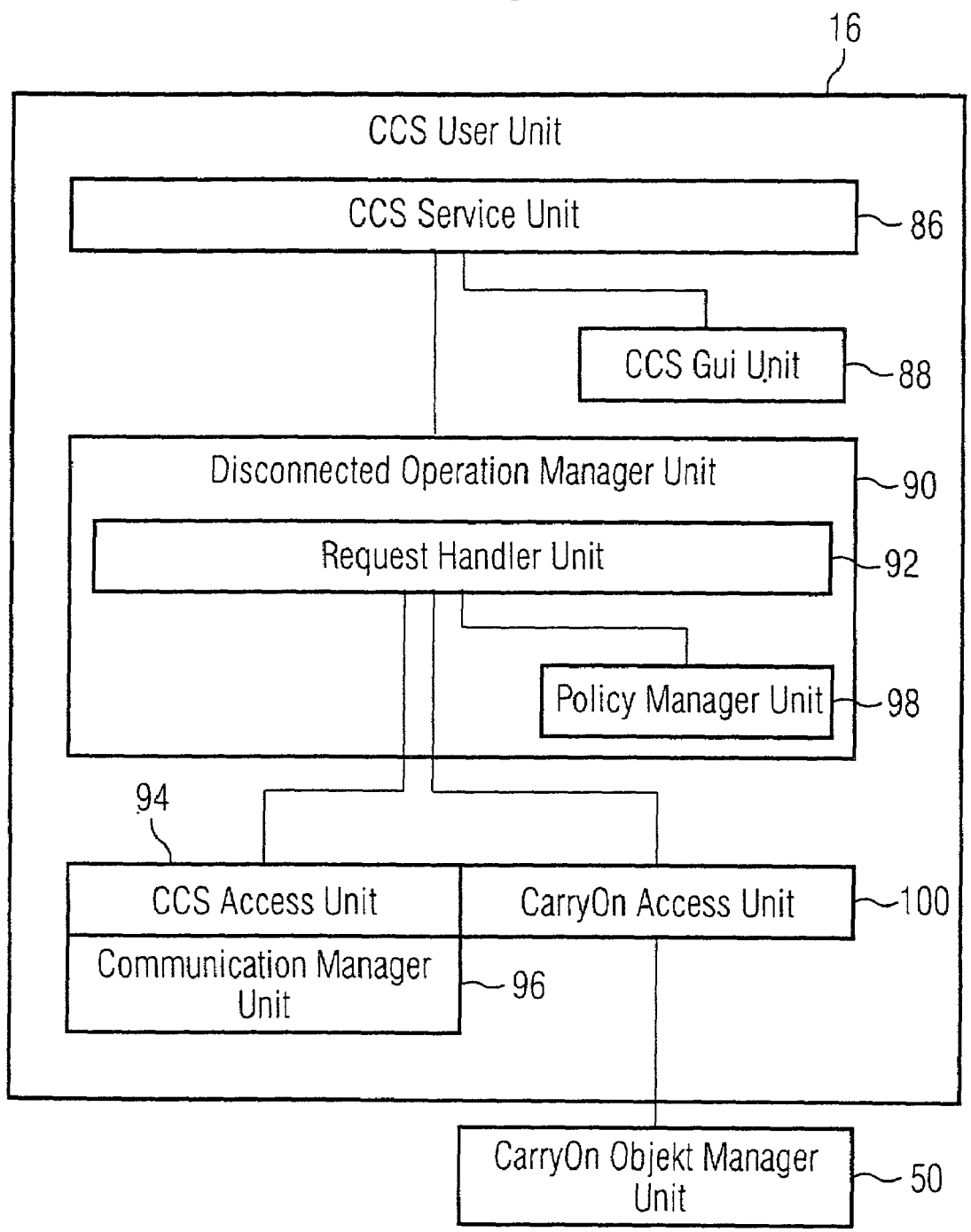
FIG. 4 illustrates how the carry on service can be imbedded into an existing service.

Integration of the Carry On into an Existing Service:

FIG. 4 shows an embodiment of how to integrate the carry on into an existing service. Basically, the normal service is executed by a CCS service unit 86. A CCS GUI (Graphical User Interface) unit 88 will interact with the user. The CCS user unit 16 is modified so as to include an option that allows the CCS service to use the carry on service. The modified CCS user unit 16 than includes a disconnected operation manager unit 90 which handles the normal processing or the hiding of disconnected operation. A request handler unit 92 decides whether the normal service delivery chain (using a CCS access unit 94 and a normal communication subsystem (communication manager) 96) can be used, or whether the carry on service will be used. A policy manager unit 98 stores policies related to that decision. A carry on access unit 100 uses the carry on object manager unit 50 for forwarding an object to the permanent communication network.

Technology Viewpoint

This viewpoint explains by way of example mapping of the rather abstracts concepts described in the earlier paragraphs to existing technologies.

Mobile Device:

The carry on service is a service offered by the mobile device. The term mobile device can comprise mobile phones, feature phones, smart phones, PDAs, wearable computers, car equipment, and many more. Depending on the operating system used and depending on the programming language, the carry on API unit 62 may be implemented in different ways.

Figure 2:
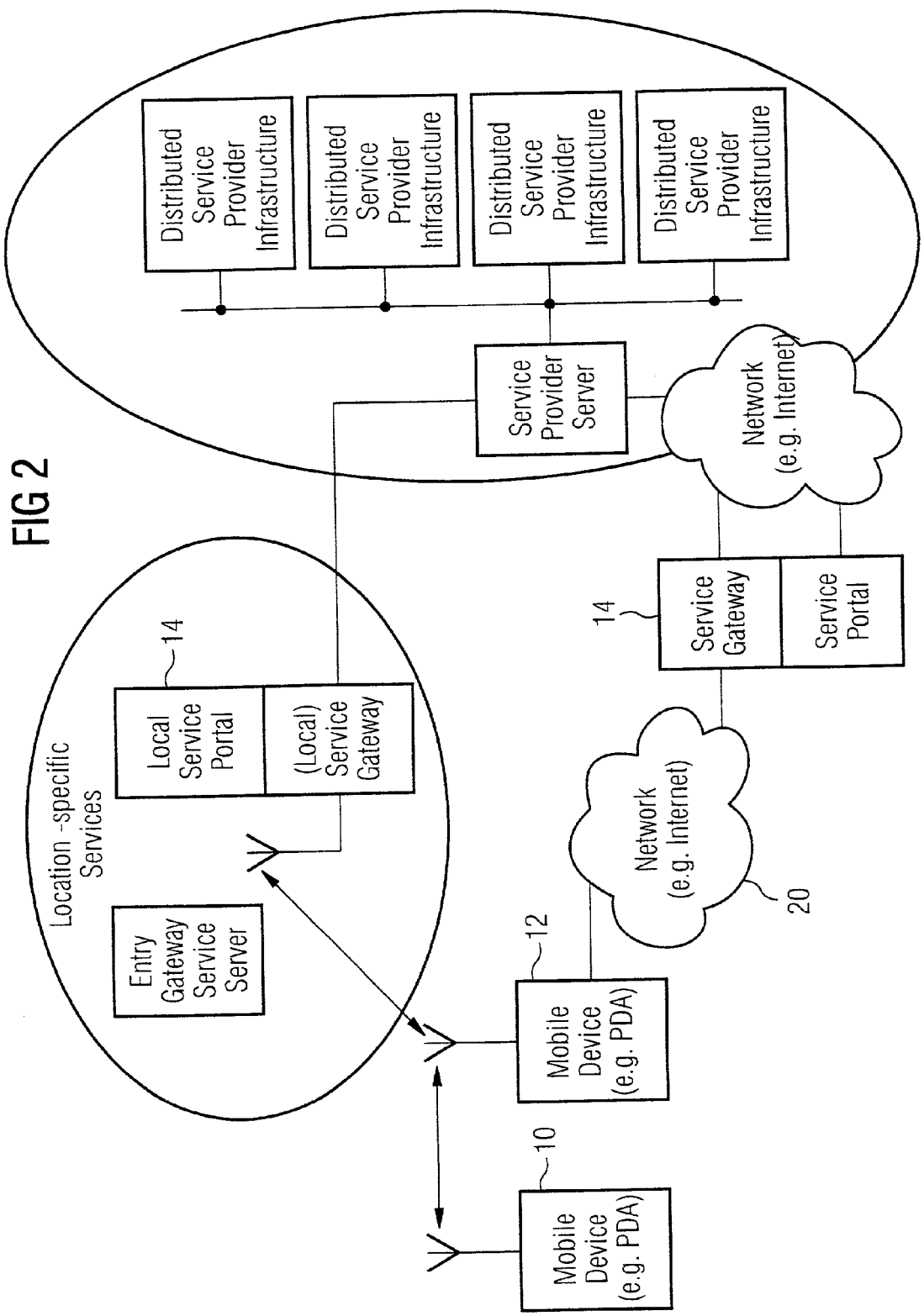
FIG. 2 illustrates an example of a carry on system using local and global services.

Carry On Gateway:

The carry on gateway can be part of a local or a global service portal (see FIG. 2). It can also be a stand-alone device providing the gateway feature.

Communication Protocol:

As to the communication protocol, the mobile device will carry out communication using a predefined communication protocol. The communication protocol used can be, for example:

HTTP: In this case carry on objects can be embedded into the body part of the protocol. They can be coded in XML or in any other serialization format.

Java RMI: The object can be exchanged using Java remote method invocation.

CORBA/IIOP: The objects can be exchanged using CORBA/IIOP.

DCOM: The objects can be exchanged using DCOM.

Asynchronous message queues: The objects can be exchanged using asynchronous message queues.

Other appropriate mapping to existing protocols can be defined. Also, special exchange protocols, for instance on top of TCP/IP, can be defined. In case different mappings are used in the practical implementation, a protocol gateway may convert from one protocol to the other.

Serialization and (Binary) Coding Formats:

The described data objects need to serialized for transmission over a communication channel. Several formats can be used and can be of advantage in different situations. In the following, some of them are summarized:

XML: A markup language designed to define different document types. A document type defines logical objects. The carry on objects can be mapped to a standardized document type.

ASN.1: ASN.1 is a data definition language mainly used in OSI protocols. It defines an abstract syntax which is then mapped to a concrete transfer syntax.

Other coding formats can be imagined.

Unit Implementation:

When implementing the above-explained functional units as software units, it can be of advantage to implement the functional units according to a component model. There are several component models existing (for instance Java Beans, COM).

In the following some application examples of the present invention are given. A first example can be in local service portals. The carry on service is a service that is provided by mobile devices in conjunction with application gateways on the permanent network. The application gateways can be add-ons to existing mobile service portals, either global or local ones (see FIG. 2).

A second example is an e-mail service that can be implemented as a CCS service. In this case, one or several e-mails can be packed into a carry on object. Also, the e-mail delivery can be organized by using a carry on service from the permanent network to the target user. In this case, relatives or friends can offer the service to fetch e-mails on behalf of others. The built-in security mechanism should prevent unauthorized people to read the e-mails.

According to a third application example, a unified or instant messaging system can utilize the carry on function to send either the original or a converted message from/to the user.

According to a forth application example, software programs can be packed into a carry on object and forwarded to a target user.

A fifth application example is the distribution of music (either single tracks or complete CDs) using the carry on service. Secure music players can be addressed for playing the content.

The invention claimed is:

1. A method of transmitting an information object from a first user device to a destination, said method comprising:

determining whether said first user device is connected to said permanent communication network means or is disconnected therefrom, including lifetime information into said information object before transmitting said information object from said first user device, said lifetime information indicating an expiring date of said information object;

transmitting said information object from said first user device directly over said permanent communication network means in case of connection of said first user device to said permanent communication network means, transmitting said information object from said first user device over ad-hoc network means to a second user device of said permanent communication network means in case of disconnection of said first user device from said permanent communication network means, said second user device acting as a temporary intermediate carrier of said information object, and forwarding said information object from said intermediate carrier over said permanent communication network means.

2. The method according to claim 1, further comprising: transmitting said information object from said first user device via a plurality of at least two successive intermediate carriers to said destination, said information object being transmitted from said first user device to a first one of said intermediate carriers and between each pair of two successive ones of said intermediate carriers over said ad-hoc network means, said information object being forwarded from a last one of said intermediate carriers over said permanent communication network means.

3. The method according to claim 1, wherein said first user device is a mobile device adapted for wireless communication over said permanent communication network means.

4. The method according to claim 1, wherein said second user device is a mobile device adapted for wireless communication over said permanent communication network means.

5. The method according to claim 1, further comprising: automatically forwarding said information object from said intermediate carrier.

6. The method according to claim 1, further comprising: automatically transmitting said information object from said first user device to said intermediate carrier.

7. The method according to claim 1, further comprising: transmitting said information object from said first user device to said intermediate carrier only upon request of a user of said first user device.

8. The method according to claim 1, further comprising: automatically discovering an available intermediate carrier by said first user device and transmitting said information object from said first user device to said discovered intermediate carrier.

9. The method according to claim 1, further comprising: selecting a particular intermediate carrier through a user of said first user device and transmitting said information object from said first user device to said selected intermediate carrier.

10. The method according to claim 1, further comprising: digitally signing said information object before transmitting said information object from said first user device.

11. The method according to claim 1, further comprising: encrypting said information object before transmitting said information object from said first user device.

12. The method according to claim 1, further comprising: including into said information object sender information indicating said first user device as a sender of said information object, and forwarding said sender information included into said information object to said destination.

13. The method according to claim 1, further comprising: rewarding said intermediate carrier for receiving and forwarding said information object.

14. The method according to claim 1, further comprising: including priority information into said information object before transmitting said information object from said first user device, said priority information indicating a level of priority of said information object.

15. The method according to claim 1, further comprising: annulling said information object if it has not reached said destination by said expiring date.

16. The method according to claim 1, further comprising: automatically accepting and storing said information object by said intermediate carrier.

17. The method according to claim 1, further comprising: accepting and storing said information object by said intermediate carrier only upon agreement of a user of said intermediate carrier.

18. The method according to claim 1, further comprising: denying said information object by said intermediate carrier when an available memory space of said intermediate carrier is too small.

19. The method according to claim 1, further comprising: removing at least one old information object stored in said intermediate carrier when an available memory space of said intermediate carrier at the time of arrival of a new information object is too small.

20. The method according to claim 19, further comprising: selecting at least one of said old information objects dependant on an age of said old information objects and removing said selected old information object in ease of a plurality of old information objects being stored in said intermediate carrier at the time of arrival of said new information object.

21. The method according to claim 19, further comprising: selecting at least one of said old information objects dependant on a level of priority of said old information objects and removing said selected old information object in case of a plurality of old information objects being stored in said intermediate carrier at the time of arrival of said new information object.

22. The method according to claim 1, further comprising: determining whether said intermediate carrier is connected to said permanent communication network means or is disconnected therefrom, and forwarding said information object from said intermediate carrier over said permanent communication network means in case of connection of said intermediate carrier to said permanent communication network means.

23. The method according to claim 22, further comprising: waiting for re-connection of said intermediate carrier to said permanent communication network means and then forwarding said information object from said intermediate carrier over said permanent communication network means in case of disconnection of said intermediate carrier from said permanent communication network means.

24. The method according to claim 22, further comprising: forwarding said information object from said intermediate carrier over said ad-hoc network means to another intermediate carrier in case of disconnection of said intermediate carrier from said permanent communication network means, optionally after a predetermined period of waiting for re-connection of said intermediate carrier to said permanent communication network means has elapsed.

25. The method according to claim 1, wherein an information object is transmitted from a source to a third user device of said permanent communication network means, and further comprising,
determining whether said third user device is connected to said permanent communication network means or is disconnected therefrom,
transmitting said information object over said permanent communication network means directly to said third user device in case of connection of said third user device to said permanent communication network means,
transmitting said information object over said permanent communication network means to a fourth user device of said permanent communication network means in case of disconnection of said third user device from said permanent communication network means, said fourth user device acting as a temporary intermediate carrier of said information object, and
forwarding said information object from said intermediate carrier over wireless ad-hoc network means to said third user device.

26. The method according to claim 25, wherein said third user device is a mobile device adapted for wireless communication over said permanent communication network means.

27. The method according to claim 25, wherein said fourth user device is a mobile device adapted for wireless communication over said permanent communication network means.

28. A computer program product for carrying out the method according to claim 1 when executed by a processor of a user device adapted for communication oer permanent communication network means.

29. A user device adapted for communication over permanent communication network means, said user device being adapted to be operated by the method according to claim 1.

* * * * *